(No Model.)

I. W. McGAFFEY.
Hose Reel.

No. 240,602.  Patented April 26, 1881.

Witnesses:
F. B. Townsend
H. W. Munday

Inventor:
Ives W. McGaffey
per
Munday, Evarts & Adcock
Attorneys.

N. PETERS, PHOTO-LITHOGRAPHER, WASHINGTON, D.C.

UNITED STATES PATENT OFFICE.

IVES W. McGAFFEY, OF CHICAGO, ILLINOIS.

HOSE-REEL.

SPECIFICATION forming part of Letters Patent No. 240,602, dated April 26, 1881.

Application filed September 3, 1880. (No model.)

*To all whom it may concern:*

Be it known that I, IVES W. MCGAFFEY, of Chicago, county of Cook, and State of Illinois, have invented certain new and useful Improvements in Hose-Reels; and I do hereby declare that the following is a full, clear, and exact description of the invention, which will enable others skilled in the art to which it appertains to make and use the same.

My invention relates to improvements in fountain hose-reels, and its object is to render the reel self-draining; also to make it capable of being moved upon its carriage, so that the direction of the nozzle may be so changed without removing the same from its holder upon the reel; and still further to so construct the reel and carriage that the carriage may be moved about and the hose be wound up or unwound while the water is playing, and without changing the direction of the stream. These objects I accomplish by making the reel conical in form and mounting it upon a vertical axis supported upon a horizontal shaft pivoted at its ends in the frame of the carriage so the reel may be tilted thereon, and providing the apex of the reel with a nozzle-holder or poising device, substantially as hereinafter set forth. These and other features are fully disclosed by the drawings and the following description.

Figure 1:
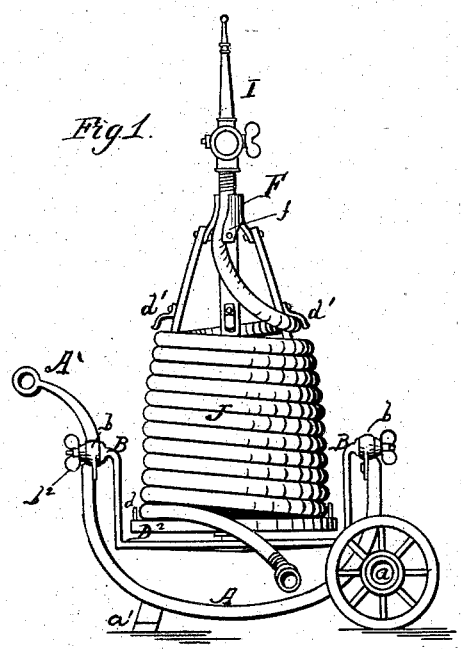
Figure 2:
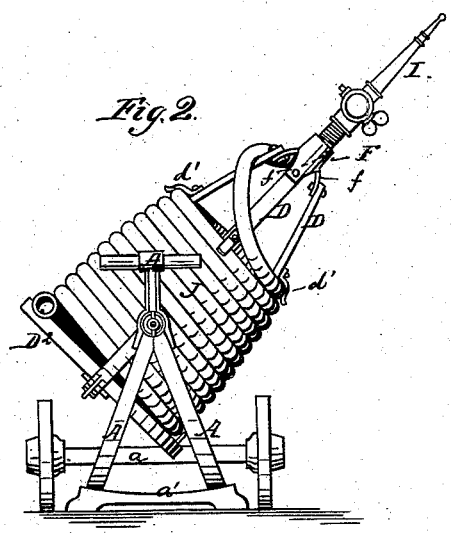
Figure 3:
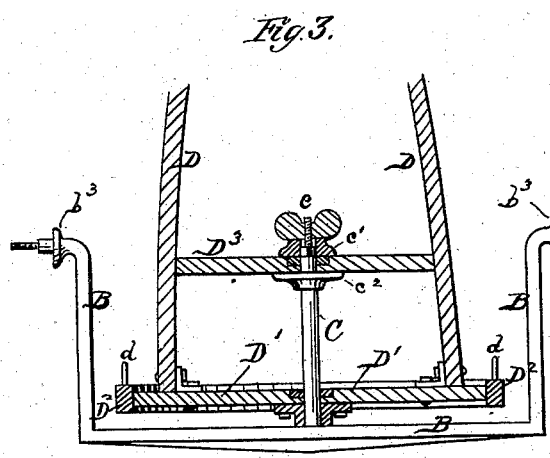
Figure 4:
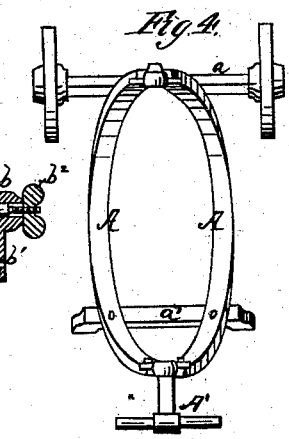

In the accompanying drawings, which form a part of this specification, Figure 1 is a side elevation of my improved reel and carriage. Fig. 2 is a front elevation of the same, showing the reel in an inclined position. Fig. 3 is a detail sectional view showing the crank-shaft and frame-work of the reel, and Fig. 4 is a plan of the carriage with reel and crank-shaft removed.

In said drawings, like letters of reference indicate like parts wherever the same are used in the several figures.

The frame of the carriage of my improved reel consists of two bowed strips, A, supported upon one side upon the axle $a$, having wheels at its ends, and by a foot or brace, $a'$, upon the other side, both axle and foot serving as cross-braces. To the front junction of the strips a handle, A', is secured, whereby the apparatus may be moved about. At the points of juncture of the strips A are bearings $b$, wherein are inserted the ends or journals of the supporting-shaft B, such bearings being bolted to the frame through the points $b'$, or otherwise secured. This shaft turns freely in the bearings, and, as already stated, it supports the spindle or axis C of the reel, such spindle being let into the shaft, or otherwise rigidly secured thereto, so as to maintain the reel vertically relative thereto at all times. This manner of mounting the reel permits it to be tipped or inclined endwise from the vertical at will, and in order that it may be secured in any inclined position I provide at one or both ends of the supporting-shaft a thumb-screw device, $b^2$, between which and the shoulder $b^3$ upon the shaft such friction may be caused upon the bearing $b$ as will insure that result.

It will be noticed that the shaft B is bent downward, and that the reel-spindle is placed centrally in the depressed portion. This is in order that the center of gravity may be near the axis upon which the reel tilts, thus balancing the parts, bringing the reel down close to the ground, and avoiding danger of too easy upsetting of the apparatus.

The reel is composed of the uprights D united at the top, bottom cross-pieces D' projecting beyond the uprights, a rim, $D^2$, running around the base, and cross-braces $D^3$, the spindle extending up and through the latter. The spindle has upon its upper end a thumb-screw and nut, $c$, and washer $c'$, and immediately below the braces $D^3$ a collar, $c^2$, so that by tightening the nut the reel may be held against revolution. At the top I unite the uprights to the points $f$ of the nozzle-holder F. The rim $D^2$ strengthens the structure, and it, together with the projecting ends of the pieces D', support the hose at the bottom. I prefer to make the reel conical, because thereby the hose, which I begin to wind at the top, is prevented from slipping down when the bottom courses have been drawn off, and the layers thereof are not apt to overlap or crowd each other. It also lightens the top of the reel and avoids an abrupt turn in the course of the hose from the outside of the reel to the nozzle-holder. The vertical reel, when supported and steadied solely from the bottom, and made without a projecting rim at its top, as in my invention, also possesses the advantage that it permits the removal of the nozzle and any portion of the hose without revolving the reel on its spindle or uncoupling from the hydrant, which is a convenience whenever frequent changes in directing the stream are desired, so that time will be saved by holding the nozzle in the hand. I may also say that the conical form has advantages over the straight form of reel for this purpose, but the latter may be used with benefit.

The rim $D^2$, which also serves as a hand-grasp in winding up the hose, is provided with a number of upright pins, $d$, which serve as holders or locks for the lower end of the hose, to prevent the same from unwinding or falling from the reel when detached from the hydrant, and the ribs D are provided, near their upper ends, with clasps $d'$, which serve to keep the nozzle end of the hose in position on the reel. The nozzle-holder consists of a metal thimble with a curved slit or opening cut in it for the insertion of the elastic hose, and is so arranged that the nozzle will point in the direction of the axis of the conical reel. I is the nozzle, and J represents the hose.

The shaft B instead of being provided with two bearings, as shown in drawings, may be made with only one; but I prefer to make it as shown, as it gives a neater and lighter construction when so made. The whole apparatus is simple, strong, and sightly.

The operation of the invention is simple. With the carriage and reel thus constructed the nozzle may be inclined at any angle, from the vertical to the horizontal, by simply turning the reel on its horizontal cranked shaft, and may be directed to any point of the compass by turning the carriage, and thus the operator has no occasion to touch the hose or nozzle with his hands in directing the same. As the nozzle points in the same direction as the axis of revolution of the reel the hose-carriage may be moved from place to place, and the hose paid out or wound up without changing the direction of the stream, and without any necessity of turning off the water. By poising the reel in the direction of the operator the operator may readily unwind the hose from the nozzle end thereof by simply giving the same a swinging motion with his hand.

The reel is balanced on the shaft which supports it, and upon which it swings, by making the shaft cranked or in the form of a crank, so that the center of gravity of the reel falls near or just below the bearings or points of support of said shaft, so that the reel may be easily turned to point in any direction, and remain stable in whatever position poised.

I claim—

1. A fountain-hose carriage consisting of a wheeled carriage and a hose-reel mounted on such carriage, and capable of being tipped or inclined endwise thereon, substantially as described.

2. A fountain-hose carriage consisting of a wheeled carriage, a hose-reel mounted on the carriage, and capable of adjustment to an endwise inclined position thereon, and a device upon the reel for holding and poising the nozzle, whereby the direction of the stream may be varied by varying the inclination of the reel, substantially as set forth.

3. A fountain-hose carriage consisting of a wheeled carriage and a vertical reel mounted thereon, and supported and steadied from below, whereby the removal of the hose is permitted without rotating the reel, substantially as set forth.

4. A fountain-hose carriage consisting of a wheeled carriage, a vertical conical hose-reel mounted on the carriage, and a nozzle-holding device located at the apex of the reel, substantially as described.

5. The combination of the reel, the pivoted or swinging support for the reel, and the carriage, substantially as described.

6. The combination of the carriage, the reel, the pivoted or swinging support for the reel, and a device for locking the reel in an inclined position, substantially as set forth.

7. The combination of the carriage, the cranked shaft pivoted in the carriage-frame, and the reel-supported upright upon the depressed portion of said shaft, substantially as specified.

8. The fountain-hose carriage consisting of a wheeled carriage having the bowed framework, and an upright reel mounted upon a cranked shaft, pivoted in the ends of the bowed frame of the carriage, substantially as specified.

9. The combination, in a hose-carriage, of the bowed frame A, axle $a$ and its wheels, and foot $a'$, all constructed and operated as described.

10. The combination, with the upright tipping reel, of the nozzle-holding thimble located at its upper end, whereby the inclining of the reel raises or lowers the direction of the water playing through the hose.

IVES W. McGAFFEY.

Witnesses:
 EDMUND ADCOCK,
 JOHN W. MUNDAY.